June 2, 1953 G. C. HARTLEY ET AL 2,640,872

TELECOMMUNICATION EXCHANGE SYSTEM

Filed April 29, 1949 14 Sheets-Sheet 1

INVENTORS
GEORGE C. HARTLEY
DONALD A. WEIR
BY Robert Harding Jr.
ATTORNEY

INVENTORS
GEORGE C. HARTLEY
DONALD A. WEIR
BY Robert Harding Jr.
ATTORNEY

TELECOMMUNICATION EXCHANGE SYSTEM

INVENTORS
GEORGE C. HARTLEY
DONALD A. WEIR
BY Robert Harding Jr.
ATTORNEY

June 2, 1953 G. C. HARTLEY ET AL 2,640,872

TELECOMMUNICATION EXCHANGE SYSTEM

Filed April 29, 1949 14 Sheets-Sheet 4

INVENTORS
GEORGE C. HARTLEY
DONALD A. WEIR
BY Robert Harding Jr.
ATTORNEY

TELECOMMUNICATION EXCHANGE SYSTEM

Filed April 29, 1949 14 Sheets-Sheet 5

INVENTORS
GEORGE C. HARTLEY
DONALD A. WEIR
BY Robert Harding Jr.
ATTORNEY

June 2, 1953 G. C. HARTLEY ET AL 2,640,872

TELECOMMUNICATION EXCHANGE SYSTEM

Filed April 29, 1949 14 Sheets-Sheet 6

INVENTORS
GEORGE C. HARTLEY
DONALD A. WEIR

BY Robert Harding Jr.

ATTORNEY

INVENTORS
GEORGE C. HARTLEY
DONALD A. WEIR
BY Robert Harding Jr.
ATTORNEY

June 2, 1953 G. C. HARTLEY ET AL 2,640,872

TELECOMMUNICATION EXCHANGE SYSTEM

Filed April 29, 1949 14 Sheets-Sheet 8

INVENTORS
GEORGE C. HARTLEY
DONALD A. WEIR
BY Robert Harding Jr.
ATTORNEY

June 2, 1953 G. C. HARTLEY ET AL 2,640,872

TELECOMMUNICATION EXCHANGE SYSTEM

Filed April 29, 1949 14 Sheets-Sheet 9

INVENTORS
GEORGE C. HARTLEY
DONALD A. WEIR
BY Robert Harding Jr.
ATTORNEY

INVENTORS
GEORGE C. HARTLEY
DONALD A. WEIR
BY Robert Harding Jr.
ATTORNEY

INVENTORS
GEORGE C. HARTLEY
DONALD A. WEIR
BY Robert Harding Jr.
ATTORNEY

June 2, 1953 G. C. HARTLEY ET AL 2,640,872

TELECOMMUNICATION EXCHANGE SYSTEM

Filed April 29, 1949 14 Sheets-Sheet 12

INVENTORS
GEORGE C. HARTLEY
DONALD A. WEIR
BY Robert Harding Jr.
ATTORNEY

June 2, 1953 G. C. HARTLEY ET AL 2,640,872

TELECOMMUNICATION EXCHANGE SYSTEM

Filed April 29, 1949 14 Sheets-Sheet 13

INVENTORS
GEORGE C. HARTLEY
DONALD A. WEIR
BY Robert Harding Jr.
ATTORNEY

June 2, 1953 G. C. HARTLEY ET AL 2,640,872

TELECOMMUNICATION EXCHANGE SYSTEM

Filed April 29, 1949 14 Sheets-Sheet 14

INVENTORS
GEORGE C. HARTLEY
DONALD A. WEIR
BY Robert Harding Jr.
ATTORNEY

Patented June 2, 1953

2,640,872

UNITED STATES PATENT OFFICE 2,640,872

TELECOMMUNICATION EXCHANGE SYSTEM

George Clifford Hartley and Donald Adams Weir, London, England, assignors to International Standard Electric Corporation, New York, N. Y., a corporation of Delaware Application April 29, 1949, Serial No. 90,322
In Great Britain April 30, 1948
13 Claims. (Cl. 178—2)

This invention relates to telecommunication in exchange systems and more particularly, though not exclusively, to teleprinter exchange systems.

The main object of the invention is to ensure the setting up of a correct connection before communication takes place, and to ensure that appropriate action is taken if an incorrect or an alternative connection is made or no connection at all can be established.

According to a main feature, the invention comprises a telecommunication exchange system in which a station identity signal is sent from one point to another a plurality of times in different, but related, code forms, means for receiving the said identity signal transmissions and for recording them in a single code form, whereby the subsequently received identity signals may be compared on receipt with the first recorded identity signal, and means for exercising different control of subsequent operations according as the said signals agree, or do not agree, in identifying the said station.

According to another feature, the invention comprises telecommunication exchange equipment arranged to receive a plurality of station identity signals transmitted in different, but related, code forms over the same channel, to record said received signals in a single code form and to compare them, and thereafter to exercise different control of subsequent operations accordingly as said signals identify, or do not identify, the same station.

In this invention, a "code form" is intended to mean the expression of a character (a letter or figure, for example) in a particular coding system, and "different code forms" as applied to one character means different expressions of that character in the same coding system. "Related code forms" means that the "different code forms" for a particular character have been derived one from the other, e. g. if the representation of a character in a 5-element constant total permutation code system of marks (positives) and spaces (negatives) (a binary system of coding) is SMMSM (—++—+) then a related code form is MSSMS (+——+—)—the "binary complement" form—and another is MSMMS (+—++—)

—"reversed code" form.

It is unlikely that a signal transmitted in one code form and subjected to reversals on the line or in equipment to one or more of its component elements will be affected exactly similarly in its derived (related) code form(s), and hence a signal transmitted in two or more related code forms which are reduced to a standard form on receipt should agree between such reduced code forms. If there is disagreement, this may be taken as evidence that one or all of the code forms has been subjected to maltreatment during transmission and that none can be relied on for correctness, and hence that checking is required.

The "double check" as described is only provided for other than local calls not involving a junction, and is used to ensure correct transmission over a junction (or a series of junctions) from an originating switching center to a terminating switching center. For local connections, including the connections to the local ends of junction calls, simple "WRU?" checking is relied on.

With this introduction to the object of the invention it is permissible to pass to a description of a specific embodiment of the invention illustrating the use of related code forms in checking an identity signal, and taking appropriate action as a result of such a check.

The invention will be particularly described with reference to the accompanying drawing illustrating as an embodiment, a teleprinter switching system employing machine switching with constant total permutation code selection and incorporating overflow junction storage. The arrangement to be described has been purposely kept simple to enable a ready understanding of the principles involved to be made, but the invention is not, of course, limited to the arrangement shown.

In the drawing—

Figs. 5A and 5B show the receiving and storing section of the register, while

Figures 5A, 5B and 6A and 6B are complementary to one another;

Figure 1:
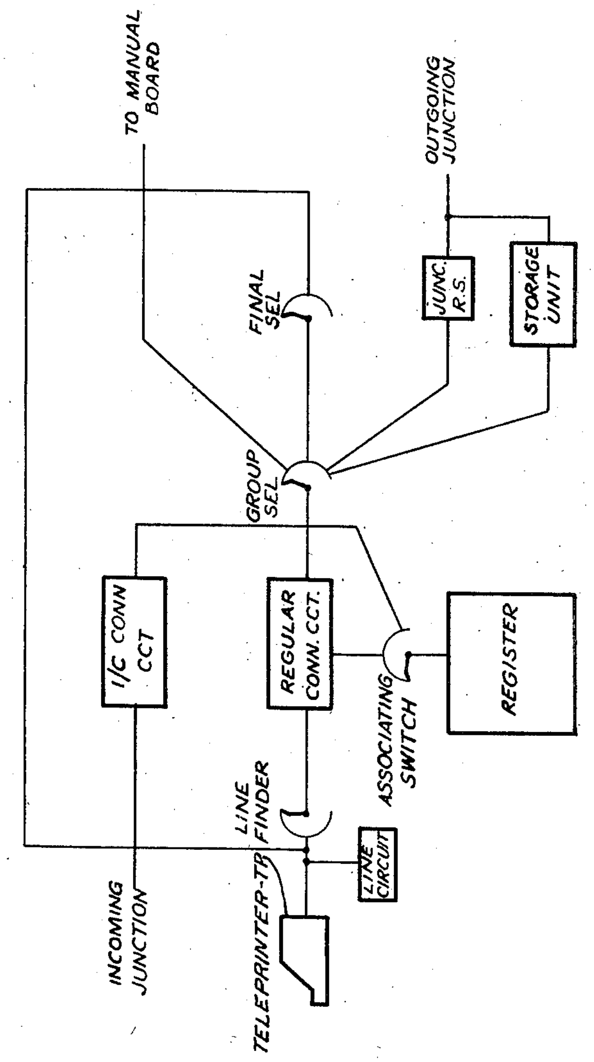
Fig. 1 illustrates in block form a trunking diagram with junction storage of the system to be described.

In the drawings, the relays are shown in accordance with the detached contact method, the contacts being shown close to the circuits which they control and not necessarily next to the corresponding relay coils. The relay coils are marked with capital letters and the corresponding contacts with the same small letters and in addition, a numeral distinguishing the various contacts of the same relay. The numeral appearing under a capital letter associated with a relay coil indicates the number of contacts controlled by the relay.

Before embarking on a detailed description of the embodiment, it will be desirable to consider some general aspects of the problems met with in number checking, and for this purpose reference should be had to Fig. 1.

The functions concerned in number checking are conditioned by the type of application concerned and may be listed as under:

(*a*) *Calling party directly connected to local called party*

Referring now to Fig. 1 the calling party, indicated as a teleprinter TP, will gain access to a regular connecting circuit via the line finder and line circuit shown, and via this to a register in a manner well known in the telephone switching art and will then discharge into the register the selection information. Here the permutation code is translated into a series of markings and the switch train set up accordingly, via the group selector and final selector shown, to the bank multiple of which the local teleprinters are connected. Connection to the called party promotes the transmission thereto of "Figure Shift—D" (the "Who are you?" or "WRU?" request of the International Alphabet No. 2 (C. C. I. T.)), which causes the called party's answer-back unit to function and send his directory code number to both the register and the calling party over the path as just set up.

In the register the returned code is checked against that originated by the calling party and stored in the register. If the two codes are identical the register releases and allows the connection to proceed; but if the two codes do not agree, a message is returned to the calling party to advise that a wrong connection has been made.

Should the local number required prove busy the detector operates a relay OCC (q. v.) and this returns the signal "OCC" to the calling party to advise him of the condition.

(*b*) *Calling party directly connected to called party via a junction*

For this case Fig. 1 is to be read in its aspects both as an "originating end" and as a "terminating end." At an originating end, a calling party (TP) is connected by means of the register (originating register) and group selector to an outgoing junction either direct, via the junction routing switch (Junc. R. S.) or via a storage unit, as shown. At a terminating end, the outgoing call (above) on the junction is received over an incoming junction and connected via an incoming connecting circuit and associating switch to the register (incoming or terminating register). From these the call is set up in much the same way as for (*a*) with, however, some slight differences.

The conditions in this case are somewhat governed by the inability of the incoming register at the terminating end to determine whether the call originates from storage or is a direct connection.

When the junction is claimed by the originating register the receive line of the junction remains at space until the terminating register is picked up when the condition goes to mark. The originating register then transfers the code and its binary complement (i. e. mark for space, and space for mark) to the terminating register and restores.

The terminating register checks the code received. If the code is incorrect, the register returns the signal "WC" to the calling party and also connects the circuit to an operator's position (shown as "Manual Board"). This latter is to cater particularly for a call incoming from storage and it is therefore arranged that the call signal at the operator's position is delayed by a predetermined time to give the calling party in a live connection the choice of clearing without calling in the operator unnecessarily. The operator would be necessary, of course, in the case of a message from storage and the delayed "WC" signal at the manual board would in that case eventually mature.

If the code is correct, selection proceeds from this point as for (*a*) and the called party's line is reached. If the called party's line is engaged the signal "OCC" is returned to the calling party and the register effects, as before, delayed connection to an operator to cater for the case of receipt from storage.

If the called party's line is free it is seized and WRU? transmitted to trigger the called party's answer-back unit. The returned signals are checked against the signals already held in the terminating register and if they are incorrect, the signal "WC" is returned to the calling party and delayed connection to the manual board initiated.

If the reply checks correctly the terminating register switches the connection through and releases.

It should be noted that the double check—transmission of code and its binary complement—is only effective over the junction route, between originating and terminating registers.

(*c*) *No junction free at an originating end*

If no free junction is found by an originating register in (*b*) the hunting selector continues the search for the particular marking designating that junction but now testing for a free storage unit. If no storage unit is found free the register detects this on the last position of the group and transmits the signal "OCC" followed by release of the register.

If a free storage unit is found, a "mark" signal is returned by it to the register to cause transfer of the selection code and its binary complement and the register then functions as if it were connected to a real junction.

(d) *Connection incoming from junction terminating end*

It is arranged that no discrimination between a message being received direct or from a storage unit is necessary by arranging that the functions appropriate to the two classes of call are each carried out. For instance if the double check of the code is incorrect the calling party should be advised in the case of an original (live) call, while in the case of a call received from a storage unit the message must receive manual attention. It is arranged that the storage unit control circuit will be unaffected by the messages returned for a possible calling party and that delay will be introduced in switching to the manual board to allow the calling party, if present upon the connection, to clear before the operator is introduced.

Thus the functions of the circuits under incoming conditions differ from local only in that the selection code must be checked upon receipt. A separate start circuit is used to indicate the condition and thus arrange for conversion of the binary complement of the code to straight code.

The circuits will now be described in detail with reference to the relevant figures.

(a) *Calling party directly connected to local called party*

Figure 2:
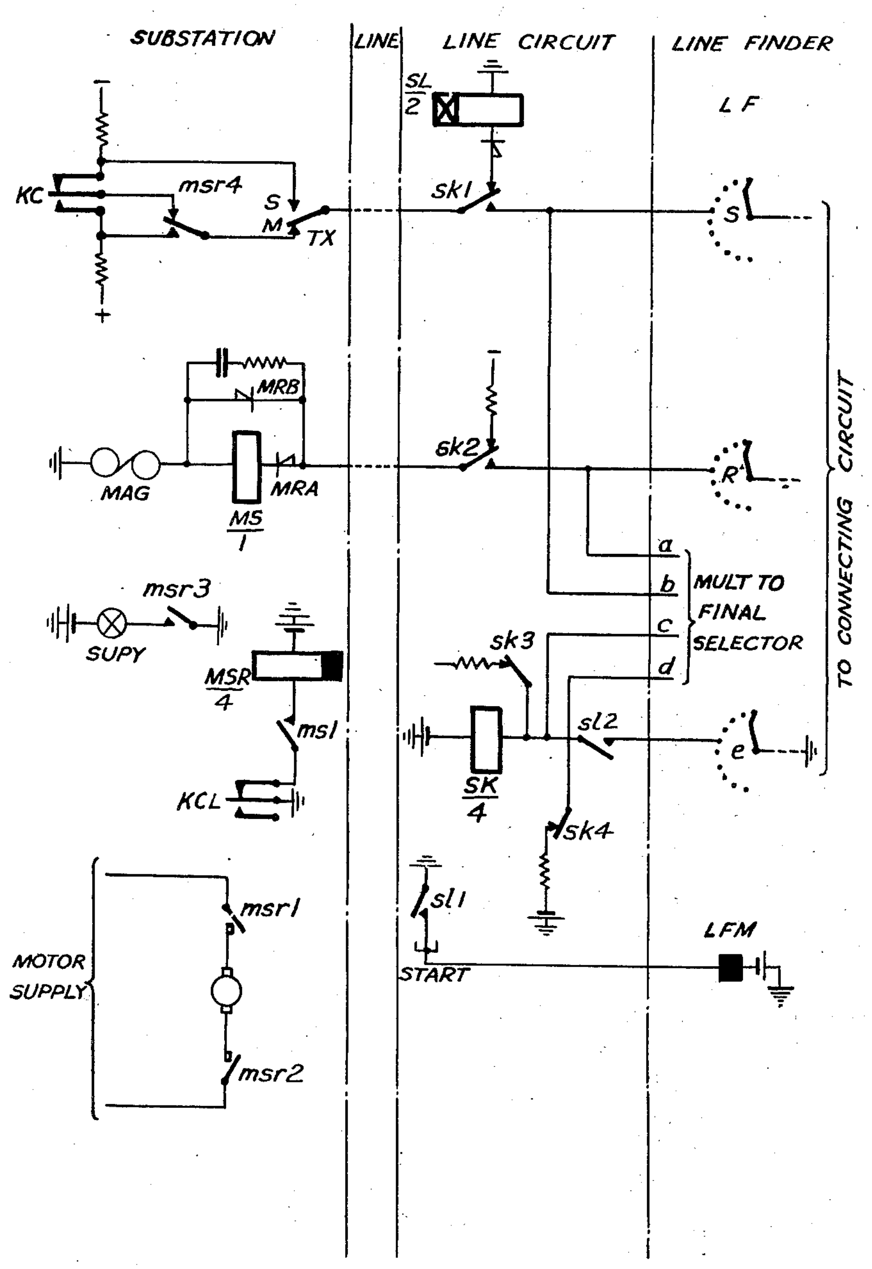
Fig. 2 shows the essential details of a calling subscriber's station equipment and exchange line circuit, with connections to a line finder bank.

The teleprinter station is assumed to be equipped with a calling key, a clear key, a supervisory lamp and facilities for the control of the teleprinter motor, as shown in Figure 2. When a party wishes to make a call, key KC is operated which reverses the line potential and so operates line relay SL at the exchange, and this, in turn, causes the association of a register with a connecting circuit and a line finder. The line finder magnet LFM is driven from *sl1* in well known manner until the calling line is reached when it is halted and relay SK of the line circuit operated via *sl2* from the earth extended over the E arc of line finder LF. SK operating disconnects the SL relay at *sk1* and switches the lines through at *sk1* and *sk2* to the connecting circuit and register, Figures 3 and 4 respectively. The calling line is busied on the final selector multiple at *sk3* and *sk4*.

Machine start relay MS (Fig. 2) in the calling station is now operated to earth by positive battery returned by the register over the R lead by the following path:

Earth, teleprinter magnet MAG, relay MS, rectifier MRA, *sk2* up, arc R of line finder LF (Fig. 3A), *swb2*, lead RC (Fig. 4*B*), lead RC, *occ3*, *su4*, *wc5*, *hsu3*, *esa2*, *lr4*, TRC in M position, to positive potential.

Relay MS operates at *ms1* the slow release relay MSR, which in turn starts the motor of the teleprinter via *msr1* and *msr2* and lights the supervisory lamp at *msr3*. MSR also by-passes the make-contacts of calling key KC, at *msr4*, so as to maintain + battery on the send line when the key is released.

The calling party may now transmit the selection information by permutation code to the register associated with the circuit. The TX contacts (Fig. 2) which are associated with the subscriber's teleprinter, transmit the intelligence in double, current signals, positive potential representing a mark and negative potential a space, over a circuit which includes contacts *sk1* up, arc S of line finder LF, lead S, *swb1* and lead SC of Fig. 3A, lead SC of Fig. 4A, *es1*, *cca1*, polarised relays TRB and TRA to earth, the latter via *cca2*. These signals are responded to by relays TRA and TRB which respectively repeat the signals into the receiver portion of the register (Figs. 5 and 7A) and start the time base, indicated by a block in Fig. 7A. The time base is not shown explicitly but may be assumed to be similar to that described in the copending application of D. S. Ridler-L. R. Brown, bearing Serial No. 85,789 and filed April 6, 1949, now U. S. Patent 2,570,279.

The function of the time base is to generate two series of equally spaced pulses in response to the start impulse, the pulses of one series—the "counting" pulses—being interleaved with those of the other series—the "scanning" pulses. The time base runs until it is stopped by a "stop" pulse specially applied. The functions of the two trains of pulses are fully described in the application hereinabove referred to, and will appear from what follows.

The reception of the selection code will now be described.

Figure 3A:
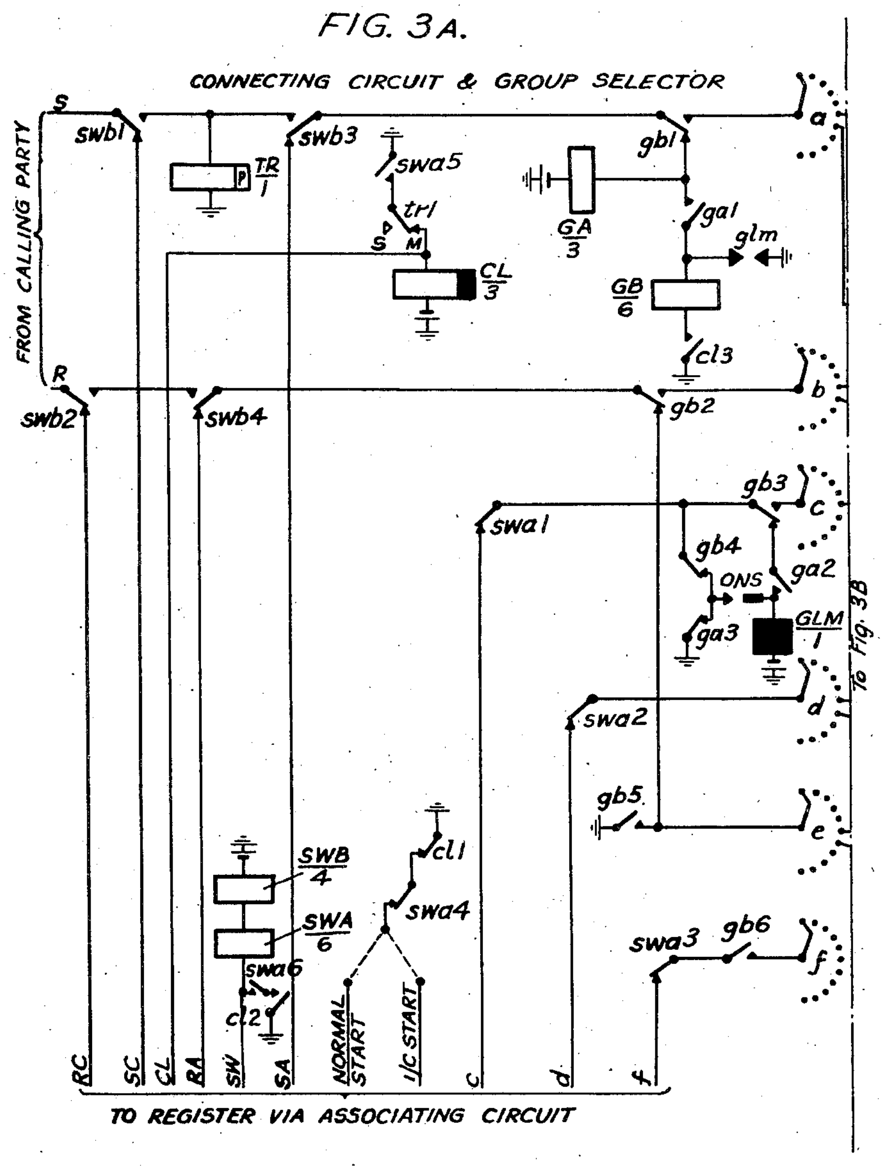
Figs. 3A, 3B and 3C show further details of the exchange equipment, with a group selector, a final selector and part of the register associating circuit.
Figures 3B, 3C:
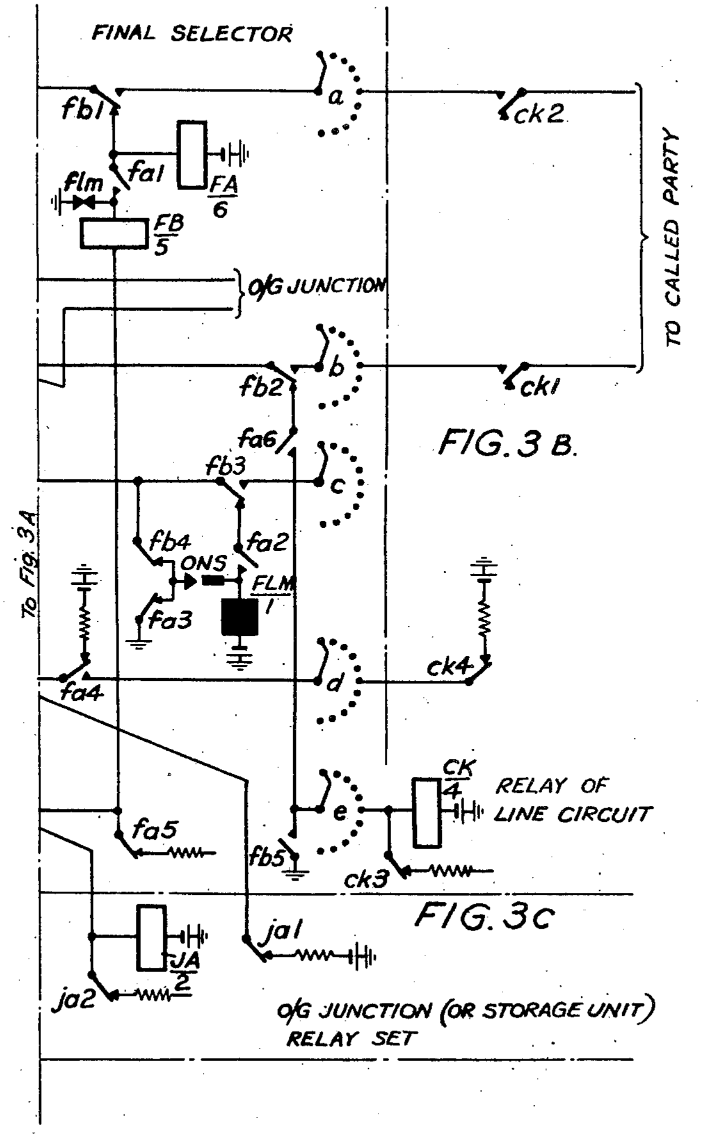

When the register and regular connecting circuit were associated, relay ST in the register (Fig. 4A portion) operated to prepare the circuit for the receipt of the code over a circuit which may be traced from ST via the Normal Start wire strapped, in Fig. 3A, to *swa4*, *cl1* to earth. ST holds on its right-hand winding to earth via *st1* up, *z1* normal.

ST has been shown throughout the various figures as a relay having 15 contacts. In practice, 8 of these would be taken over by a relief relay to ST.

The constant total teleprinter signals used in this system are the usual 5-element signals of marks or spaces (the "intelligence" elements), together with an initial "start" element, which is always a space, and a final "stop" element, which is always a mark.

Figure 4A:
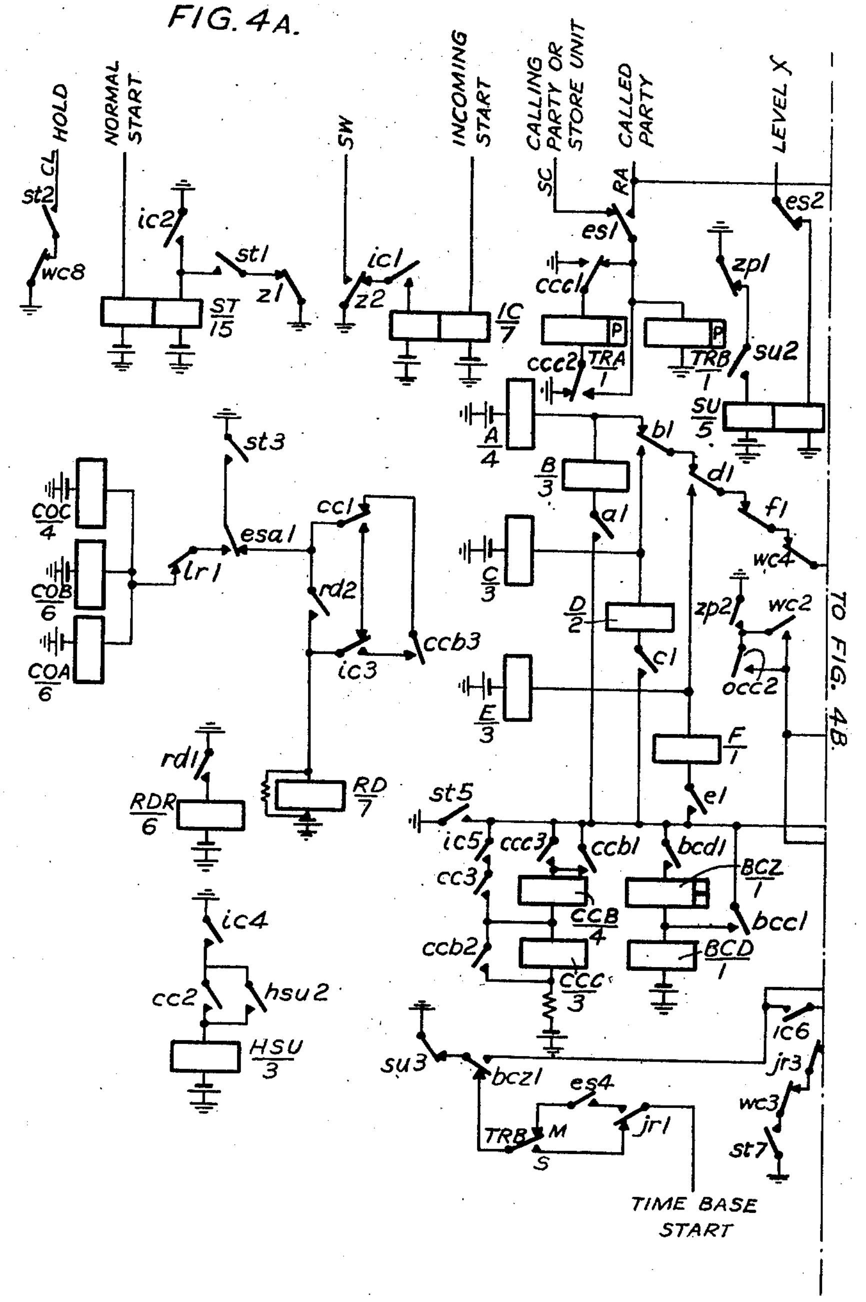
Figs. 4A and 4B show part of a register.
Figure 5A:
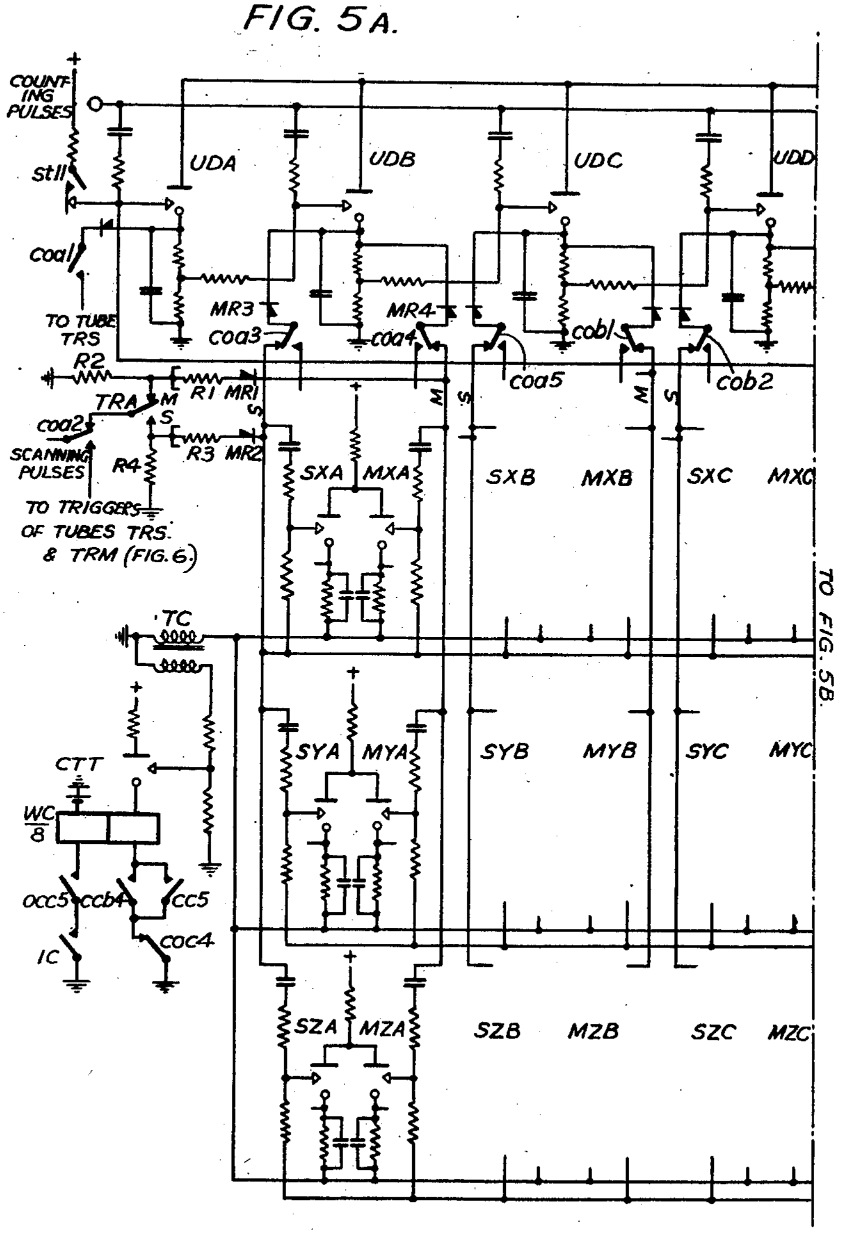

The starting space element operates TRA and TRB to space, the operation of the latter starting the time base over a circuit which may be traced in Fig. 4A from earth over *su3* normal, *bcz1* normal, TRB at S, *jr1* normal (see also Fig. 7A), the operation of the former, in Fig. 5A, being ineffective as the scanning pulses have not yet been generated.

Figures 7A, 7B:
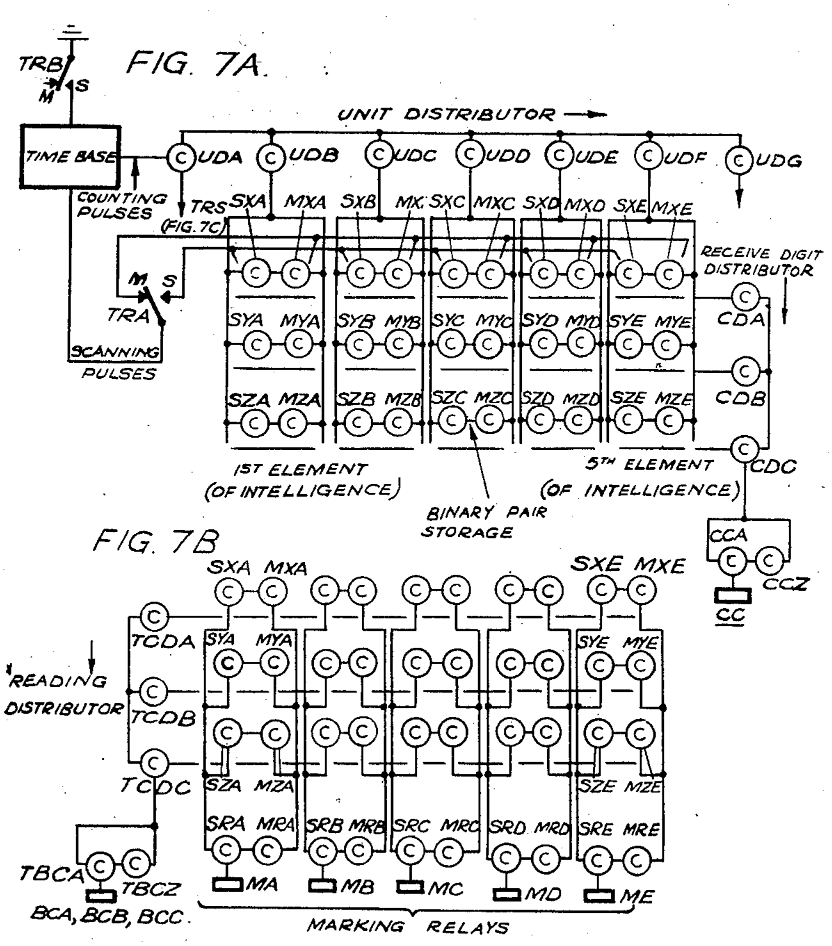
Figs. 7A, 7B and 7C show the register functions in skeleton form, Fig. 7A the receiving and storing function, Fig. 7B the reading function, and Fig. 7C the transmitting function.

Figure 7A shows diagrammatically the arrangement of the receiver portion of the register and Fig. 5A shows this portion in greater detail. Tubes UDA to UDG are connected as a scale of seven counter and form the unit counter or distributor operating in the manner described in the aforesaid copending application Serial No. 85,789, Patent 2,570,279 dated October 9, 1951. Its function is to advance from UDA forward, one tube each time a counting pulse is received from the start-stop time base, each tube as it fires preparing the next tube for firing and extinguishing the previous tube. ST in operating, triggers UDA (Fig. 5A) by change-over of the make-before-break contacts *st11* generating a positive impulse so that the first tube of the distributor is struck while the circuit awaits the arrival of a counting pulse, and, in this condition UDA by reason of the voltage drop across the cathode resistor extends a positive bias to prepare the trigger electrode of UDB so that this will be the tube to strike when the first counting pulse is received.

In a similar manner, ST triggers, (Fig. 5B), at *st13*, CDA of the three tubes CDA, CDB and CDC forming the receive digit distributor and also, at *st12*, CCZ of the binary pair CCA, CCZ which count the number of cycles of the digit distributor. Firing of CCZ at this point is purely preparatory. CDA extends bias from its cathode to prepare the trigger electrode of CDB so that CDB will operate in conjunction with UDG upon its next operation and the arrival of a counting pulse, and also extends positive bias to the control electrodes of the binary pairs SXA, MXA etc. (Figs. 5A and 5B) in the X series of tubes. Details for only one pair of tubes in each of the X, Y and Z series have been shown but the arrangements for the other pairs are exactly similar.

Twenty milliseconds after the starting of the time base by TRB the first counting pulse matures and is applied over the counting pulse lead (Fig. 5A) to the control electrode of UDB which strikes, biassing UDC so that it operates on the second counting pulse. UDA is extinguished by virtue of the potential drop in the common anode resistor R7. When UDB strikes, a positive bias is extended from its cathode via MR4, *coa*4, and MR3, *coa*3, respectively, to the rectifier resistance gates formed by MR1, resistances R1, R2 and MR2, resistances R3, R4. The scanning pulses occur midway between the counting pulses so that at 30 milliseconds from the start of the time base, a scanning pulse is connected over the Scanning Pulse lead and via *coa*2 to the junction either of resistances R1—R2 or of resistances R3—R4 dependent upon the position of the tongue of relay TRA. If TRA is at mark, then a positive scanning pulse is fed to the trigger electrode of tube MXA and as this is already in receipt of a positive bias from CDA, the tube fires, recording that the first intelligence element of the first digit was a mark. Other mark tubes of the same digit row, MXB, MXC etc., cannot strike because the positive scanning pulse potential is dissipated through their own R1—MR1 gates (shown multipled at TRA-M) as tubes UDC, UDD etc., are all normal and the relevant M leads thus at earth potential. Tubes MYA and MZA, although in receipt of the scanning pulses, cannot strike because they are not in receipt of positive trigger bias (i. e. from CDB and CDS respectively).

Had the first intelligence element been a space, the tongue of relay TRA would have been at space, thus connecting the scanning pulse to the tubes SXA, SYA, SZA, of which SXA would be the only tube to strike.

The succeeding counting pulse triggers UDC so that the tubes SXB—MXB are prepared for the receipt of the next scanning pulse.

The digit distributor proceeds in this manner to record the intelligence elements of the first digit, which is completed with the tube UDF struck. The next counting pulse fires UDG which thus extends positive over MR5 to control the gate formed by resistances R5—R6. The previous counting pulses were dissipated in resistance R6 with UDG holding point P at or near earth potential but with UDG now struck, a counting pulse matures at point P and thus triggers tube CDB via *coc*3 in the receive digit distributor, CDB receiving bias from CDA. CDB extinguishes CDA via the common anode load resistance R8 and at its cathode, extends bias to CDC and also to the trigger electrodes of tubes SYA, MYA, SYB, MYB etc. in the Y series of tubes, to prepare them to receive the elements of the second digit.

The firing of UDG also causes a positive potential stop pulse to be sent out from its cathode to stop the time base, and pulse potential is also sent back over resistance R9 to prepare UDA for operation on the next counting pulse to arrive. TRB reverts to mark (normal line condition).

The second digit now commences and re-starts the time base. After 20 milliseconds, the first counting pulse matures and operates UDA, after 40 milliseconds UDB and so on as before, with TRA this time connecting the scanning pulses to operate SYA—MYA, SYB—MYB etc. As before, when the digit has been received, the next succeeding counting pulse strikes UDG and steps the receive digit distributor so that CDC strikes and the tubes SZA, MZA, SZB, MZB etc. in the Z series of tubes are biassed in anticipation of the receipt of the third character. UDG also prepares UDA once more and stops the time base.

The third digit now commences. TRB restarts the time base and the digit is received as described above, and recorded on tubes SZA, MZA etc. in the Z series of tubes.

Tube CDC also biasses the trigger electrodes of tubes CDA, CCA and CCZ in addition to those of the Z series of tubes, so that when the counting pulse following receipt of the digit is allowed by UDG to mature at point P, CDA strikes again and CCA also strikes, extinguishing CCZ. CCA operates relay CC which is serially connected in its discharge path and which relay is used to indicate that the digits have been received and to prepare the register for its reading and transmitting functions.

Figure 5B:
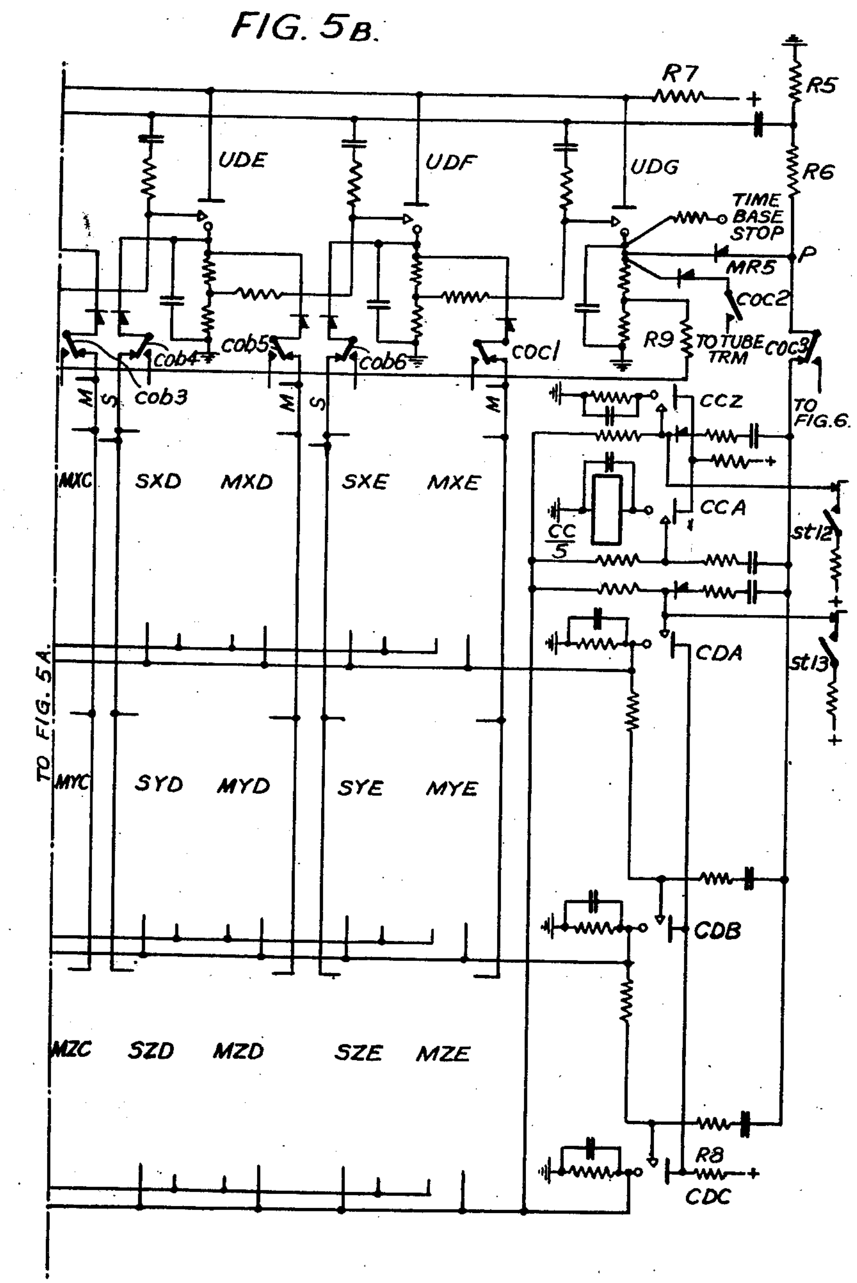

Referring now to Figure 4A, the operation of CC in Fig. 5B completes a circuit for relay RD from battery via *ic*3, *cc*1 up, *esa*1, *st*3 up, to earth. RD operates, locking over its own contact *rd*2, and operates RDR over an obvious circuit via *rd*1.

Figure 4B:
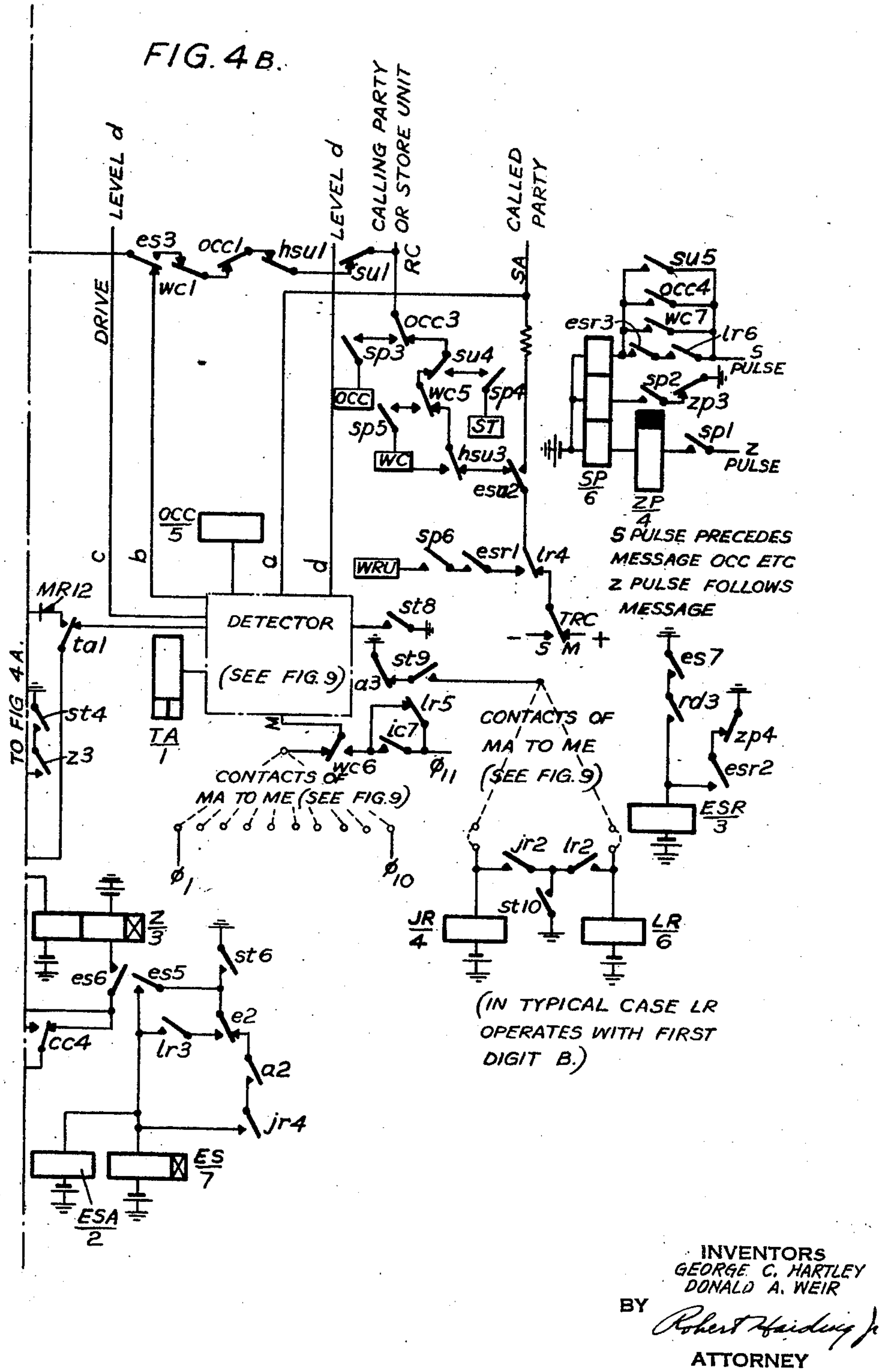
Figure 9:
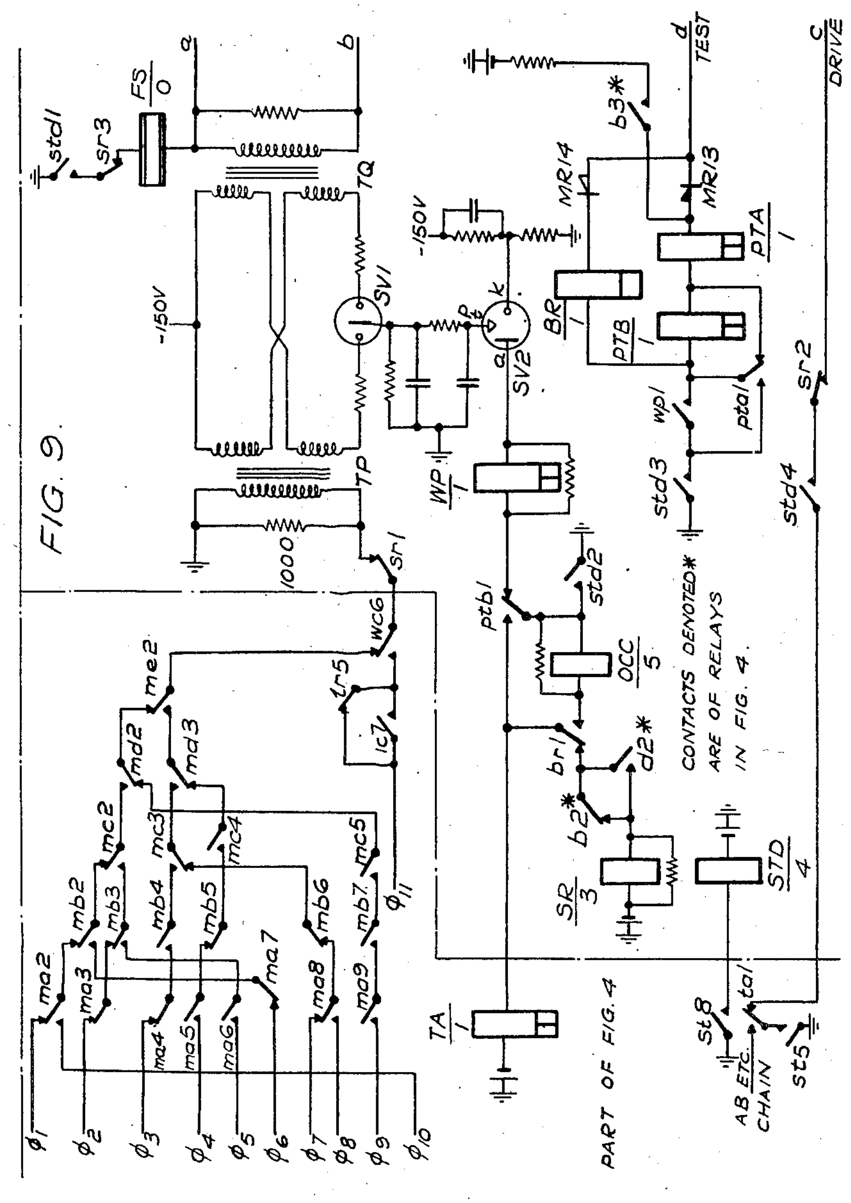
Fig. 9 shows the detailed circuit of the detector illustrated as a block in Fig. 4B.

Relays RD and RDR connect the trigger electrodes of the "reading" tubes SRA, MRA etc., in the R series of tubes (Figs. 6A and 7B) to the cathodes of tubes SXA, MXA etc., via leads SA, MA etc., over contacts *rd*4, *rd*5, etc., and the rectifiers like MR6, MR7 and so on. When relay ST operated upon seizure of the register, it fired tube TCDA of the reading and transmitting distributor via *st*15, and tube TBCA of the binary pair TBCA and TBCZ via *st*14. TCDA provides a positive potential from its cathode which blocks the rectifiers like MR8, MR9, connected to it from the X chain of tubes, so that if, for instance, the SXA, SXB, MXC, MXD and SXE tubes are struck, there will exist positive potentials on the leads SA, SB, MC, MD and SE due to the X series of tubes alone and these will trigger the corresponding reading tubes SRA, SRB, MRC, MRD, SRE. Consequently relays MA, MB, ME will operate and at their contacts connect an appropriate phase marking to the detector (Figs. 4B and 9). The corresponding potentials in the Y and Z series of tubes are ineffective because TCDB and TCDC are normal and the rectifiers like MR10, MR11, gate these potentials to earth.

It is necessary here to digress a little to discuss the use of phase marking for the control of automatic selectors.

This principle of phase marking for this purpose is disclosed in the U. S. Patent No. 2,424,585. Briefly a source of alternating current is transformed into 12 sources having equal phase displacement between each phase, the whole occupying 360 degrees. Thus it can be arranged that phase 1 is characteristic of the outlets corresponding to digit 1, phase 2 characteristic of the outlets corresponding to digit 2 and so on, the 11th and 12th phases being available for special outlets or purposes. A phase corresponding to the received digit may thus be connected to a detector and the latter so arranged that only when the phase potential encountered upon the tested switch outlet corresponds with that connected to the detector, will the detector function.

In practice, it is necessary also to determine if the detected contact is free or busy and thus the detector must include facilities for checking the line condition. In addition it must be possible for a selector to be driven over a group of outlets, such as the outlets from a group selector corresponding to the digit concerned or the outlets of lines connected to the same subscriber's station.

In the circuits shown in the accompanying drawing the selectors used are homing-type single-motion unidirectional switches. In the case of group selectors, the outlets to a particular final selector or junction group are for convenience, arranged to occupy consecutive outlets of the arcs. The contact of the arc after the last outlet of a group is not connected to any trunk but bears a positive potential which indicates to the detector circuit that no free trunk has been found in the group concerned. A permanent marking of all the phases is connected to the *b* outlets on these positively marked contacts so that the detector will always function independently of the marking sought.

In the case of final selection, it is necessary first to select the group of lines designated by the tens digit and then to find the particular line characterised by the units digit. Here it is found convenient to group all lines designated by the particular tens digit on consecutive outlets and also to indicate that all lines in a particular tens group have been tested by providing a spare outlet immediately following the tens group which bears a positive potential in a similar manner to that of group selection. Such segregation of the tens groups is convenient because it allows the searching selector to be arrested after all units associated with the tens group have been searched and thus prevents the necessity to delineate between units associated with the required tens group and units associated with other tens groups on the same arc.

Figure 8A:
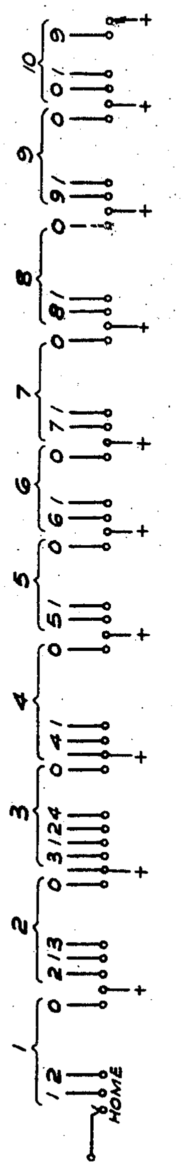
Figs. 8A and 8B are included to illustrate typical outlet allocations for a final selector to enable a clearer appreciation to be had of the detector circuit of Fig. 9.
Figure 8B:
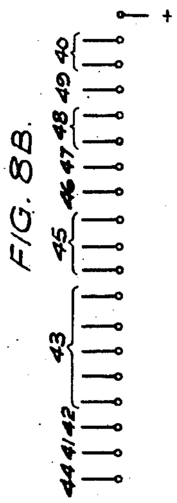

To simplify the final selection testing arrangements, the position of lines in the group of tens concerned is conditioned by the tens digit. Figure 8A shows the arrangement where it will be seen that the first line of the particular tens group is that line which has the same units designation. Thus 11 is the first line of the tens "one" group, 22 that of the tens "two" group and so on. Figure 8B shows a typical outlet arrangement for a particular tens group. Here 43, 45, 48 and 40 all have more than one line per number so that search over all the lines associated with that number should be made before a busy condition is recorded.

DETECTOR CIRCUIT

The principal component of the detector circuit shown in Fig. 9 is concerned with the detection of the phase marking. This is formed by transformers TP and TQ, gas discharge tubes SV1 and SV2, and high speed relay WP, with their associated resistors and condensers.

The phase marking (φ1 . . . φ10) determined by the selection code is connected by the marking relays (MA to ME) (Figs. 6A and 6B) to the primary winding of TP (via *wc6*, *sr1*) while the primary winding of TQ is connected to the selector under control. While the phases on the two transformer primaries are different a potential will be maintained by transformer action upon the two co-operating cathode electrodes of tube SV1 so that this tube will strike from these two cathodes to the anode at each half cycle of the phase marking frequency, the capacity-resistance network in the anode circuit maintaining the negative potential at point P substantially constant. In this condition tube SV2 cannot strike because there exists insufficient potential across any of the gaps to cause breakdown. However, when the primary of the transformer TQ encounters the same phase potential as that connected to TP, tube SV1 ceases to break down because the transformer secondary potentials are not sufficiently different. Thus after the delay caused by the capacity-resistance network in the anode circuit, electrode *t* of the tube SV2 rises toward earth potential, breaks down the control gap and thus the cathode-anode gap so that relay WP operates in a manner to be described later.

It is now desirable to revert to a discussion of the main processes of group and final selection, and to return to the details of the operation of the detector circuit later.

Referring now to Figures 3A and 4B, the detector block extends earth over the *a* lead and the SA lead to operate relay GA (Fig. 3A) of the group selector via *swb3* and *gb1* contacts normal. Operation of GA completes the latch magnet (GLM) circuit to drive the switch by earth from the detector (Fig. 4B) over lead *c*, *swa1* normal, *gb3* normal and *ga2* operated, latch magnet to battery. The detector tests the circuit via lead (Fig. 4A) *b*, *es3* normal, RA lead, *swb4* normal, *gb2* normal and arc *e* of the group selector. When a free outlet is detected and confirmed, the detector removes the GA operating earth from lead *a* so that GB (Fig. 3A) operates in series with GA over *ga1* up, *cl3* up, and holds it, CL having been operated upon the operation of ST (Fig. 4A) via CL lead, *st2* up, *wc3* to earth. GB claims the final selector and switches the selecting leads forward via *gb1* and *gb2*, to the wipers of arcs *a* and *b*.

The first digit of the called subscriber's code determines the class of call (local or junction) and hence, the first operation of the MA . . . ME marking relays (Figs. 6A, 6B) also completed a circuit for the LR relay (Fig. 4B) as the first digit designated the call as local and this relay conditions the circuit accordingly. LR operates from battery to earth over a selection of MA . . . ME contacts (as, e. g. in Fig. 9), *st9* up, *a3*, and holds over *lr2* up, *st10* up.

The detector also operates relay TA (Figs. 4B and 9) which via *ta1* extends earth received over *st5* (Fig. 4A) via MR12, *wc4*, *f1*, *d1*, *b1* contacts normal to operate register relay A to battery. Relay A prepares the register relay B circuit at *a1* and steps on the reading distributor by firing tube TCDB in Figs. 6A and 7B and thus sets the marking relays MA . . . ME to the pattern on the tubes bearing the second digit i. e. tubes SYA, MYA etc. TCDB Fig. 7B is fired by an impulse generated at the make-before-break contacts *a4* (Figs. 6A and 7) on their operation, and conveyed over *coa6* to the control electrode of TCDB.

The detector again extends earth over the SA lead to operate relay FA (Fig. 3B) in the final selector (via *swb3*, *gb1* (Fig. 3A) up, arc *a* of group selector, *fb1*) and releases relay TA. The release of TA allows register relay B (Fig. 4A) to operate in series with its A relay (over *a1* up) while the FA relay in the final selector connects up the latch magnet FLM via *fa2* up, *fb3* normal to the *c* arc of the group selector. The final selector drives in search of the tens marking and when this is satisfactorily detected relay TA reoperates and operates relay C in the register (Fig. 4A) via a similar path as for relay A, but switched at *b1* up to relay C. C prepares at *c1* a circuit for operating relay D and steps on the digit distributor as before, by firing TCDC over *c2* (Figure 6A) so that the marking tubes (SRA, MRA etc.) now read the value of the third digit, changing the marking relays MA . . . ME accordingly, releasing TA relay and thus allowing D relay to operate in series with its C relay (over *c1* up) and causing the detector to again connect the drive so that the final selector is now set to the units marking. When this is satisfactorily detected the earth is removed from the SA lead so that relay FB (Fig. 3B) in the final selector operates in series with FA over *fa1* up, arc *e* of group selector, *gb5* up, to earth, and the lines are switched through (at *fb1*, *fb2*).

The earth applied over *fb5* and the final selector *e* arc operates the called party's CK relay which at *ck1* and *ck2* extends the line to the called party, and at *ck3* and *ck4* removes the phase and battery markings from the final selector banks.

The register must now check the called party's line for a correct connection by transmission of the "Who are you?" code, and the detector therefore functions again, operating relay TA (Fig. 4B). This operates relay E (Fig. 4A) via the same circuit as for relays A and C, but switched now at *d1* up, and E operating steps the transmitting digit distributor back to tube TCDA (from a pulse generated at *e3* (Fig. 6A)), relay TA releases and relay F (Fig. 4A) operates over *e1* up, in series with E.

One contact of relay E completes a circuit for relays ES and ESA (Fig. 4B) as follows: earth, *st6* up, *e2* up, *lr3* up, relays ES and ESA in parallel to battery. ES is slow to operate and allows ESA to operate first. ESA operating disconnects relay RD (Fig. 4A) at *esa1*, but owing to the resistive short circuit across its coil this relay is slow to release, so that when ES operates after its short delay, relay ESR (Fig. 4B) operates over earth, *es7* up, *rd3* (not yet released), and locks under the control of relay ZP at *zp4* and over its own contact *esr2*.

ESR connects the upper winding of the SP relay to the S pulse lead via *esr3* up, *lr6* up so that it will operate upon the arrival of the first S pulse. When this occurs SP operates and locks to earth on its middle winding via *zp3* normal, *sp2* up, connecting the WRU? signal (Figure Shift—D) derived from a common signal generator (designated by the letters WRU in the middle of Fig. 4B) via *sp6* up, *esr1* up, *lr4* up, *esa2* up, to the SA lead and thus to the called party via the group and final selectors' *a* arcs. At the end of the cycle of transmission the Z pulse operates relay ZP in series with the lower winding of SP over *sp1*, holding relay SP for the duration of the pulse but causing its release, *zp3* being now open, when the pulse ceases. ZP also releases relay ESR at *zp4* so that the cycle is not again started, and ZP is, of course, itself released at *sp1* now normal.

Receipt of WRU? by the called party trips his answer-back mechanism, causing the return of his directory code to the register via the final and group selector *b* arcs and *ck1* up, *gb2* up, *swb4* normal, RA lead (into Fig. 4A), *es1* up, TRB relay to earth; and from *es1* up via *ccc1* normal, TRA relay, *ccc2* normal also to earth, so that TRA and TRB respond to the signals sent back. The signals are also returned to the calling party over lead RC from lead RA via *es3* up (Fig. 4B), *wc1* normal, *occ1* normal, *hsu1* normal, *su1* normal, RC lead, *swb2* normal (Fig. 3A).

Thus the register and the calling party receive the called party's answer back in parallel, the cycle of operation of the receiver portion of the register (Fig. 5A) being exactly as described earlier, noting that upon the operation of CC by the firing of CCA at the end of the reception, the cathode circuit of tube CTT (Fig. 5A) is completed over *cc5* up, *coc4*. Tube CTT may be triggered by pulses derived from the step-up transformer TC, over the primary of which is supplied a common earth feed to all the storage tubes SXA, MXA, SYA, MYA, SZA, MZA, etc. in the X, Y and Z series of tubes.

Now, as the signals are received, they should coincide exactly with what has already been received as selection information and stored on the X, Y and Z series of tubes, and thus no change of the conditions in the transformer primary should occur, but should the two patterns be other than identical, the tubes in at least one pair will change over their status, causing a disturbance in the conditions in the primary of TC and generating an output pulse from the secondary of the transformer which will trigger tube CTT and thus operate relay WC. WC connects the upper winding of the SP relay (Fig. 4B) to the "S" pulse lead at *wc7* and also prepares the RC lead circuit at *wc5* so that when SP operates the signal "WC" derived from the common generator (designated by the letters WC in the middle of Fig. 4B) is transmitted to the calling party via *sp5* up, *wc5* up, *su4* normal, *occ3* normal, RC lead, *swb2* (Fig. 3A). WC also breaks the connection between RA and RC at *wc1* so that the message is not extended forward to the called party. When the "Z" pulse matures and ZP relay operates, as previously described, a circuit is closed for relay Z (Fig. 4B) to earth, via *zp2* up, *wc2* (Fig. 4A). Z operates and locks over its own contact *z3* up via *st4* up and at *z1* disconnects relay ST which restores and so returns the circuit to rest, Z releasing after ST has released.

If the returned code checks correctly the cycle will be completed without any change of pattern and thus without firing CTT. CC (Fig. 5B) will restore when the check is complete because tube CCZ will strike when CDC fires and extinguish CCA, and relay Z will then operate over its right-hand winding via *es6* up, *cc4* normal, *jr3* normal, *wc3* normal, *st7* up, to earth. As before, Z restores the register to normal but incidentally extends an earth to relays SWA and SWB (Fig. 3A) over lead SW from *z2* up (Fig. 4A) to operate these switching relays in series to complete the through connection and allow the register to drop out. SWA and SWB lock to earth via *cwa6* up, *cl2* up, and CL relay is held over *swa5* and contact *tr1* relay TR at mark. Switching through connects relay TR to the send line and as this is normally at mark, relay CL is maintained.

The arrangement TR-CL is provided for the detection of the clear signal, constituted by a long space condition on the calling line generated when the calling party clears by pressing KCL (Fig. 2). MSR restores and extends negative potential (space) on the S lead via KC normal, *mrs4* normal, TX at M. Thus TR moves its *tr1* contact to space and breaks the circuit to CL which eventually restores, causing release of the connection by the release of SWA and SWB via the breaking of contact *cl*2 to earth. CL is arranged to hold during transmission of normal characters, being a slow-release relay.

Before passing on to a detailed discussion of sections (*b*), (*c*) and (*d*) mentioned on pages 6 and 7 it will be advisable here to complete the description of the detector circuit (Fig. 9) in relation to group and final selection, filling in details of the operation which have so far been assumed.

GROUP SELECTION

The operation of the register relay ST (Fig. 4A) operates relay STD (Fig. 9) over *st*8 which extends an earth on the detector *a* wire via *std*1 up, *sr*3 normal, retard coil FS, to lead SA (Fig. 4B) and thence to operate the GA relay in the connecting circuit (Fig. 3A). As described in the appropriate section above, the operation of GA prepares the circuit for rotation of the group selector, extending the detector *b* or RA lead (Figs. 4A and 3A) via *swb*4 normal, *gb*2 normal, to the testing arc *e* where the phase marking will be encountered. The earth provided over *st*5 (Fig. 9) and *ta*1 is extended via *std*4 up and *sr*2 normal and the detector *c* lead (Fig. 3A) to operate the latch magnet or clutch GLM of the group selector and thus initiate rotation, as previously described. Further, STD connects earth via *std*3 up to prepare an operating circuit for relays BR and PTA being connected to the detector *d* lead and hence to the *d* arc of the group selector (via *swa*2). STD also completes at *std*2 an earth circuit for the anode *a* of tube $SV_2$ via *ptb*1 normal and WP relay.

When the group selector *b* arc encounters the same phase as that applied to TP, tube $SV_2$ fires and thus operates relay WP. WP at *wp*1 completes the circuit of PTA to the *d* lead from earth, *std*3 up, *wp*1 up, *pta*1 normal, PTA coil, rectifier MR13, and then via the *d* arc the circuit tests for battery (via *fa*4 normal (Fig. 3B) for example). Should the outlet upon which the wiper is resting be free, the relay PTA will operate, and, in so doing, remove the short-circuit from relay PTB at *pta*1 and lock to *std*3 up. PTB operates in series and, at *ptb*1 up, disconnects the $SV_2$ anode circuit so that WP may release, and operates relay TA on the change-over. TA at *ta*1 cuts the drive and steps the distributor relay chain formed by A, B, C, D, E and F relays (Fig. 4A), all as previously described.

PTB also at *ptb*1 up operates relay SR over a circuit which includes *br*1 normal, *b*2 normal (of the register B relay) and SR relay to battery. SR disconnects at *sr*3 the earth from lead *a* and thus allows the group selector GB relay to operate, switching through the circuit to the appropriate final selector or other circuit.

Should the outlet test busy, i. e. encounter no battery on the *d* lead, PTA and hence PTB etc. will not operate so that the drive will continue until a free outlet is found or until the whole group has been searched. If the latter, then relay BR will operate via rectifier MR14 from the positive battery connected to the *d* arc (as explained in connection with Figs. 8A and 8B). MR13 prevents the operation of relay PTA on positive battery but BR completes at *br*1 up a circuit of TA via OCC relay and *std*2 up so that TA operates and cuts the drive as before. BR at *br*1 breaks the operating circuit of relay SR so that this remains normal and therefore the circuit of the group selector is not switched through. OCC relay operates in series with TA and this connects the signal "OCC" derived in a common generator to the calling party over a circuit in Fig. 4B which includes *sp*3 up, *occ*3 up, and lead RC.

The circuit restores to normal consequent upon the receipt by the register of a "Z" pulse which operates ZP and hence Z, the latter switching the connecting circuit to be held via the calling party and thus releasing the register relay ST and hence the detector circuit relay STD.

FINAL SELECTOR FUNCTION

When the group selector switches through, it removes the negative battery from the *d* lead, as the final selector will be on its home contact, and thus relays PTA and PTB will release, relay TA and later relay SR following. SR reconnects earth at *sr*3 to the *a* line to pick up the final selector FA relay and thus prepare the switch to drive, while SR also completes the drive circuit to the *c* lead at *sr*2 already prepared by the release of TA; STD is still held, of course.

The release of TA allows relay B in the register to operate which prepares the counting chain for the next operation of TA, while disconnecting SR (at *b*2) so that it cannot operate with the next operation of TA. B also prepares an operating circuit for relay PTA at *b*3, over *c*3 normal.

The marking relays MA . . . ME connect the phase characteristic of the tens digit and the detection circuit operates as in the group selection case except that (i) as soon as WP operates PTA follows because of the battery circuit provided by relays B and C; and (ii) SR cannot now operate because of *b*2. The final selector is thus prevented from switching through. Eventual operation of TA causes the marking to change to that of the units digit and the detector again functions to search for this new marking. Relay C in the register operates from TA and cuts off the PTA circuit at *c*3, while upon the release of TA, D operates and prepares again the SR circuit at *d*2.

The operation is the same for a single line group or for a multi-line group, the selector continuing to rotate until either a free line or a positive potential condition on lead *d* is encountered. If the former then PTA operates and functions as previously described. If the latter BR operates when the whole of the outlets characterised by the particular tens digit have been tested, causing the signal "OCC" to be returned to the calling party as before.

CONNECTION TO OPERATOR

The phase 11 is used for this function. Thus, when a wrong code check occurs and relay WC operates in such conditions that the call should be routed to the manual board, this phase marking is connected to the transformer TP via *lr*5 normal, *wc*6 up, *sr*1 normal, and the appropriate selector rotates in the normal manner.

Consideration may now be had of the other types of call to be considered ((*b*), (*c*) and (*d*), column 3, line 69 to column 5, line 26).

(*b*) *Calling party directly connected to called party via a junction*

The calling party proceeds as described in (*a*) above and discharges the selection code into the register. When the three digits have been received the marking relays read the first digit and the contact strappings operate relay JR (Fig.4B), instead of LR, signifying that the call is for a junction, while an appropriate marking is connected to the detector. The group selector is driven to find a free outlet to the required first digit and when this is successful relay TA in the detector operates as before and register relay A (Fig. 4A) follows. A steps the reading distributor (Figs. 6A and 6B) and causes ESA and ES to operate by earth over *st6* up, *e2* normal, *a2* up, *jr4* up, ES and ESA to battery. ESA disconnects RD at *esa1*, and operates relays COA, COB and COC in parallel over *lr1* normal to condition the gas tube circuits for transmission (Figs. 6A and 6B and 7C).

When the junction is claimed, spacing battery (negative) is returned upon the RA lead (Fig. 3A) via group selector arc *b*, *gb2* up, *swb4* normal, until a register is connected at the distant end, and during this interval TRB is maintained at space by this returned negative. The tongue of TRA (Fig. 5A) is disabled at *coa2* up. When a mark condition is received, TRB (Fig. 4A) starts the time base to initiate transmission forward of the selection code from earth via *su3* normal, *bcz1* normal, TRB at mark, *es4* up, *jr1* up (Fig. 4A).

Figure 6A:
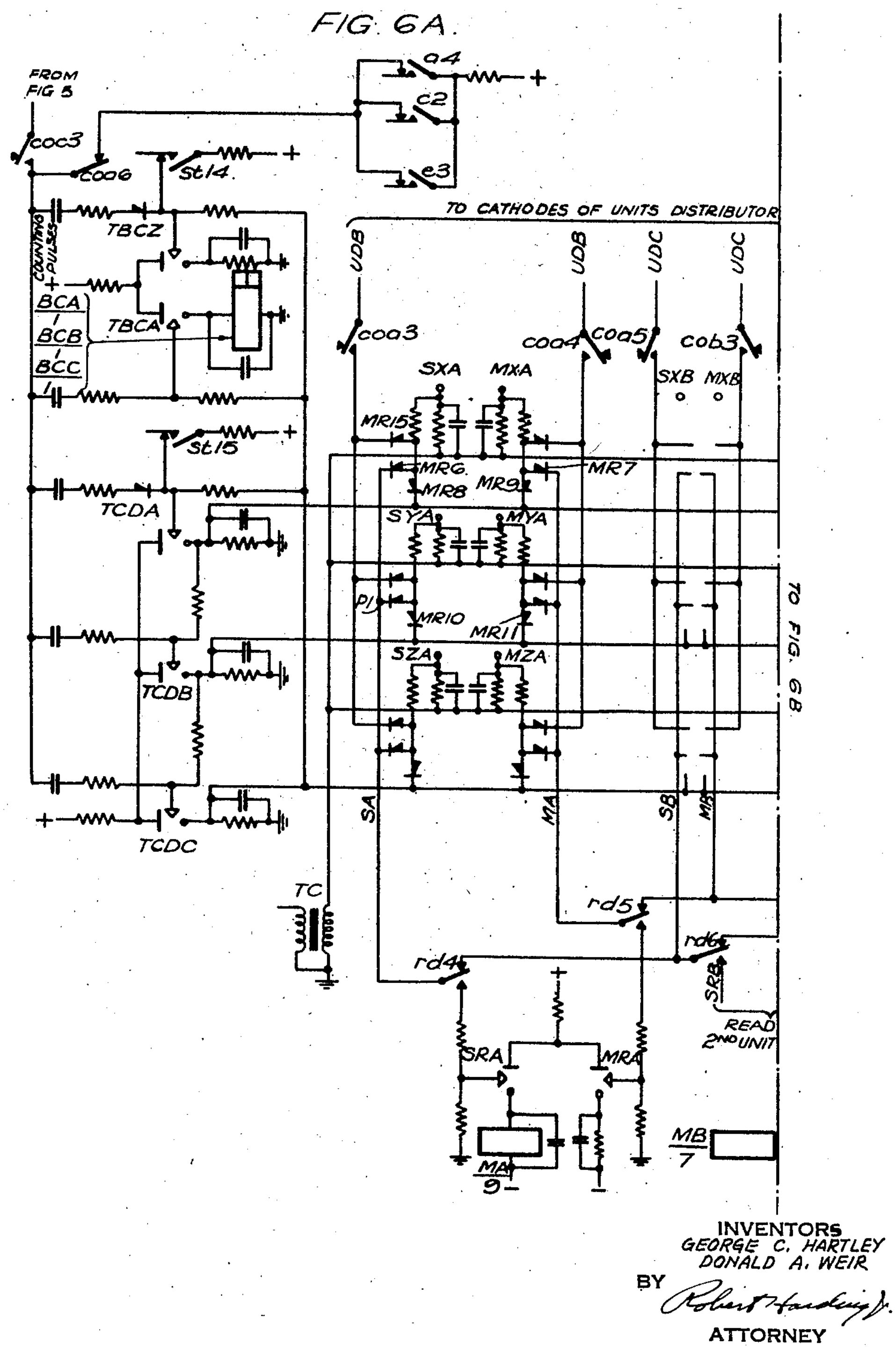
Figs. 6A and 6B show the same portion of the register as Figs. 5A and 5B but bringing out the reading and transmitting functions while suppressing the actual storage functions.
Figure 6B:
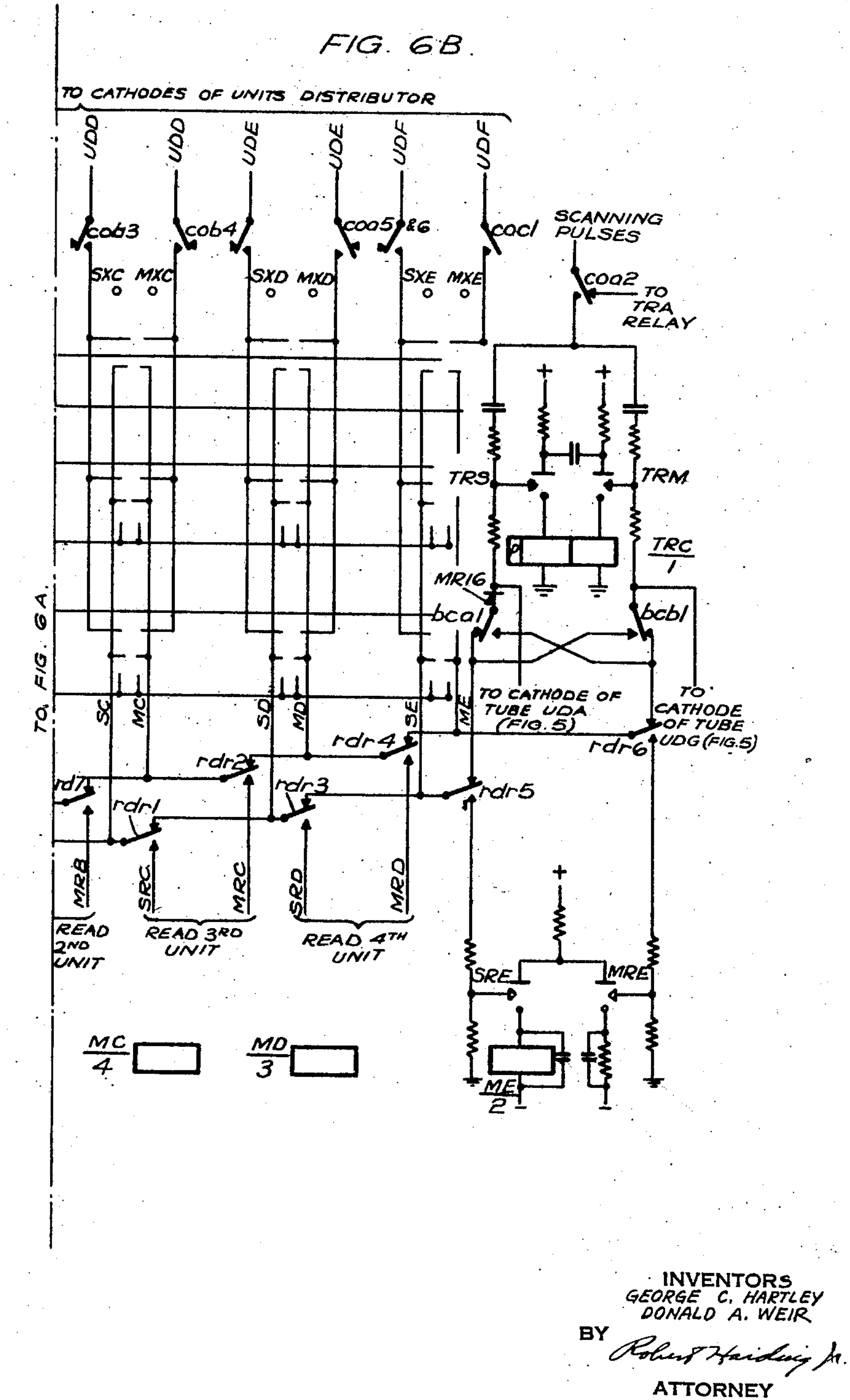
Figure 7C:
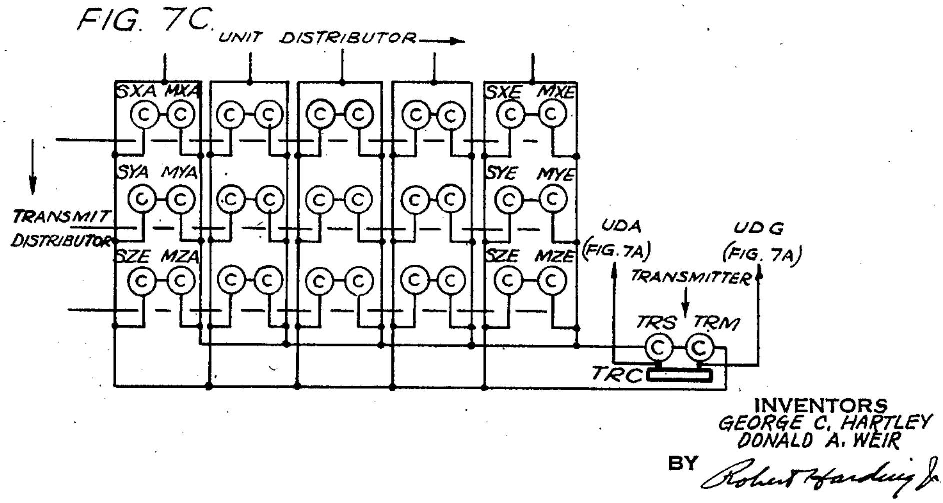

Referring now to Figs. 6A and 6B it will be seen that operated relays COA etc. transfer the units distributor tubes from the control electrodes of the tubes in the X, Y and Z series of tubes, to control the detection of the cathode potentials existing on SXA, MXA etc., of these series, in conjunction with the reading digit distributor formed by TCDA, TCDB, TCDC, so that tubes TRS and TRM may examine the stored digits and thus transmit the intelligence. It will be seen, for example, that if tube SXA is fired, only when rectifiers MR15 and MR8 are blocked by positive potentials, derived respectively by the firing of UDB and of TCDA, will it be possible for point P1 to become positive by potential applied via MR6 and thus bias the trigger electrode of tube TRS via *rd4*, *rd6*, *rdr1*, *rdr3*, *rdr5*, and *bca1* (all normal); and MR16. When a scanning pulse matures under these conditions and is applied via *coa2* up, tube TRS will trigger and relay TRC thus be brought to the space condition.

In the transmission of the code it is, of course, necessary to transmit the start and stop elements of the code as well as the five intelligence-containing units. These additional potentials are supplied from the cathodes of tubes UDA (Fig. 5A) and UDG respectively, of the unit distributor and applied over *coa1* up, *coc2* up, respectively, to the trigger electrodes of tubes TRS and TRM respectively. Thus when the time base starts and so causes the units distributor to run through successive cycles, relay TRC is first put to space upon receipt of the first scanning pulse 10 milliseconds after the start, then repeats the code already stored and then upon receipt of the seventh scanning pulse returns to make, with bias from UDG.

At the seventh step in the cycle of the units distributor, i. e. with tube UDG struck, a counting pulse is allowed to pass to the digit distributor via *coc3* up, (Figs. 5 and 6) so that it steps to the next position: TCDB strikes and TCDA is extinguished.

The process described continues until the three digits have been sent when tube TBCA (Fig. 6) operates, thus extinguishing TBCZ and operating relays BCA, BCB and BCC. BCC operates relay BCD (Fig. 4A) via *bcc1* and *st5*, which prepares an operating circuit for BCZ (Fig. 4A) at *bcd1*, and relays BCA and BCB cross over the connections to the tubes TRS and TRM at their contacts *bca1* and *bcb1* so that for the five intelligence units of each character TRS will read marks and TRM spaces. The start and stop controls are not of course reversed since connection to the cathodes of UDA and UDG are made above the relay contacts.

The time base is still connected so that the digit distributor and unit distributor again commence reading the stored values but this time because of the reversal to TRS and TRM the binary equivalent of the intelligence portion of the code is transmitted to line. The whole cycle of transmission is completed but now tube TBCZ operates and thus quenches TBCA so that relays BCA, BCB and BCC restore. BCC restoring allows the operation of BCZ which at *bcz1* cuts off the time base connection and operates relay Z (via *su3*, *es6* up). As before, Z releases ST and operates relays SWA and SWB in the connecting circuit to switch through the connection.

(*c*) *No junction free*

The search for a free outlet is not given up if all junctions are busy, as storage units are provided to simulate a junction in all respects as far as the switching equipment is concerned, thus artificially increasing the size of the junction group and, by providing monitoring conditions while awaiting a free junction in which to discharge the message, increasing the loading of the circuits provided.

Thus if a free storage unit is encountered in the search, the circuits function almost precisely as described in (*b*). When a storage unit is claimed, relay SU (Fig. 4A) operates from earth, relay SU, *es2* normal, level *f* into Fig. 3A, *swa3* normal, *gb6* up, arc *f* to battery (see Fig. 8). SU operates and locks to *zp1* normal, *su2* up and completes the "S" pulse circuit to SP via *su5* while preparing the RC lead in Fig. 4B (via *occ3* normal, *su4* up, *sp4*) for the transmission of "ST" to the calling party to indicate that a storage unit has been seized. When the "S" pulse matures the signal "ST" is transmitted and ZP eventually operates, restoring SU and SP. SU restoring prepares the time base circuit for another cycle of operation, at *su3* (Fig. 4A).

The storage unit is claimed by the operation of relay SA (Fig. 10) via group selector arc *e*, which starts the storage unit motor and prepares the circuit for the reception of the selection code. SA disconnects the slow release relay SS at *sa2* which, after a time sufficient for the motor of the storage unit to achieve full speed, connects space by the change-over of *ss1* to the *b* wire. This is received on the RA wire of the register and operates relay TRB (Fig. 4A) to mark (ES being up) via *es1* up, thus starting the time base and transferring the stored code and its binary equivalent as before.

When the discharge has been completed the register will release from the connection, switching through the lines, as for a junction connection, so that the message may be discharged by the calling party into the storage unit.

Figure 10:
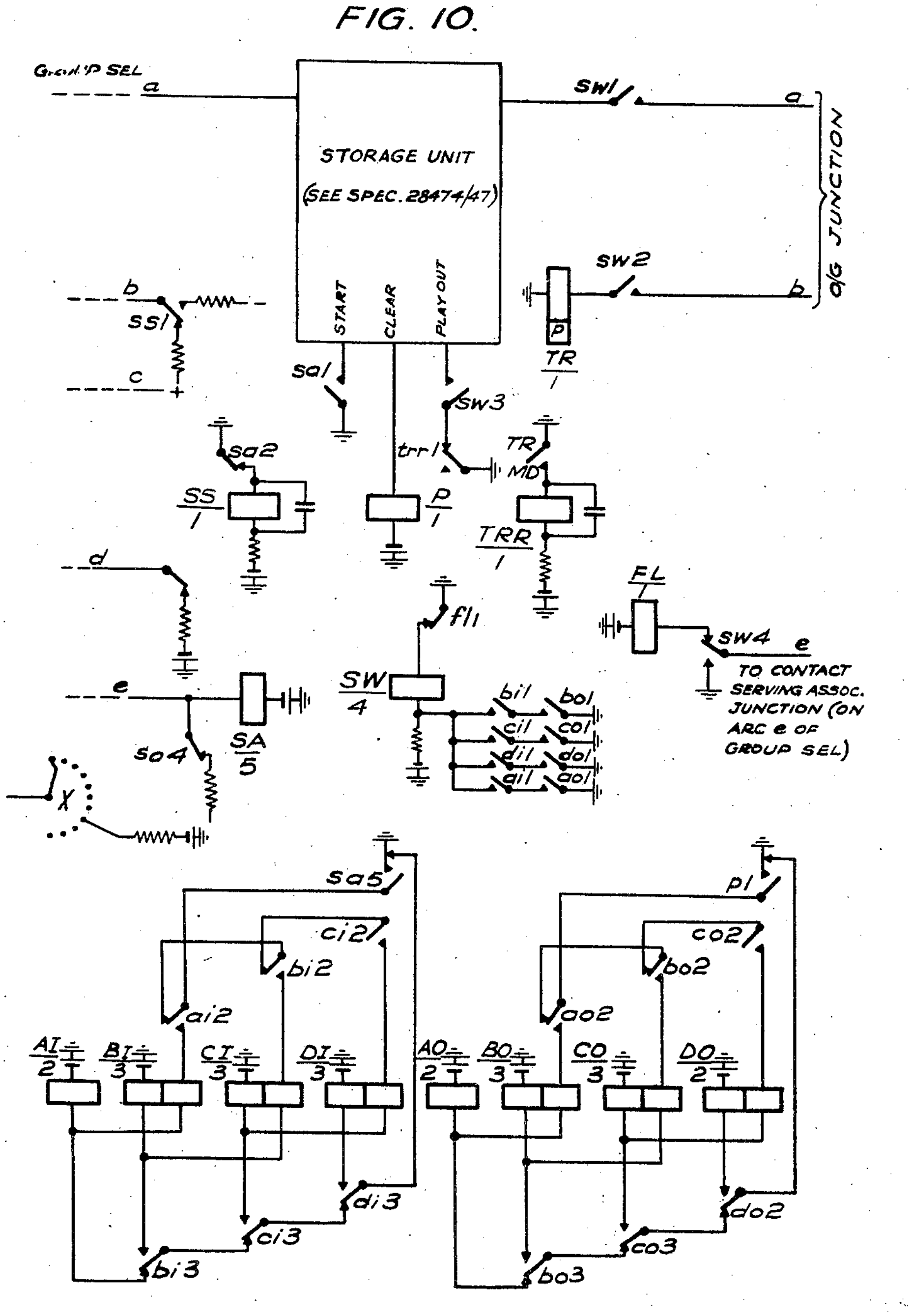
Fig. 10 illustrates the storage unit control circuit.

When the SA relay of the storage unit control circuit releases owing to the calling party clearing, having discharged his message, it causes the "in" counter, formed by relays AI, BI, CI, and DI (Fig. 10) to advance one step while the "out" counter formed by AO, BO, CO and DO remains in its original position. Counters of this type have been described previously, and in brief, it will be seen that with the circuit as indicated in Fig. 10, each operation of *sa5* (in the "in" counter) or of *p1* (in the "out" counter) will cause the respective counters to advance one step, a step being constituted by the operation of the next relay in the A–B–C–D series, in cyclic order.

Initially, earth over *sa5* normal is applied over *di3*, *ci3*, *bi3* (all normal) to AI relay, operating it. This prepares a circuit (over *ai2* up) for the operation of BI over its right-hand winding when *sa5* is subsequently operated. Operation of *sa5* transfers the earth to the upper chain of contacts, operating BI in series with AI, holding AI, and preparing at *bi3* a holding circuit for BI over its left-hand winding and at *bi2* an operating circuit for CI.

On the release of *sa5*, the earth is transferred back to the lower chain to hold BL over *bi3* up, and causing AI to release. Release of AI prepares at *ai2* an operating circuit over *bi2* up for CI in series with BI when *sa5* again operates, exactly as before.

The process continues indefinitely, the relays operating and releasing in cyclic order as described, and returning again to AI when the third release of *sa5* releases DI, thus producing a scale-of-three counter for the operations of SA.

When, as described, the "in" counter has advanced one step and the "out" counter is unchanged, relays BI and AO only of the two counters, are operated, thereby removing the short circuit of relay SW. Now relay FL monitors via *sw4* the *e* wire of the junction to which the outgoing leads of the storage unit are connected, in parallel with the JA relay of the junction (see Fig. 3C), so that when the junction is freed by removal of earth at *gb5* (Fig. 3A), FL restores and relay SW operates over *fl1*, switching the lines through.

TR monitors the junction *b* line condition. If this is "space," then TRR operates from TR at "S" and the storage unit is prevented from discharging by the loss of the earth from the "play-out" lead at *trr1*. When, however, a register is connected at the distant end of the junction, the line condition changes to "mark" and TR allows TRR to restore, thus initiating over *trr1*, *sw3* up, discharge from the storage unit. TRR is arranged to hold through reception of a series of characters, even if "letters" is repeated.

When the message has been played-out the long space clear signal is detected by the storage unit and relay P operates to step the "out" counter. This brings the two counters into step and thus relay SW is again short circuited (via *bi1*, *bo1*) and consequently restores, removing at *sw4* the busying earth from the junction *e* wire.

Further messages received would cause the circuit to function as already described it being possible with the counting circuit shown to store three messages. It should be noted that when relay SA operated, it operated BI but held AI (in series) so that SW remained short-circuited (via *ao1*) until the message had been completely received in the storage unit.

Should no free storage unit be found then the detector will operate relay OCC as described previously, the register releasing after the transmission of the "OCC" signal under the control of ZP.

(*d*) *Connection incoming from junction*

When a message is received over a junction it will arrive via an incoming connecting circuit in which *swa4* (Fig. 3A) is strapped to the I/C start lead. This, when the register is associated, causes relay IC (Fig. 4A) to operate (holding over *ic1* up, *z2*) and so prepare the circuit for the function of checking the receipt of the selection code plus its binary complement.

Until the digits have been received in a straight manner, the circuit functions as for a local call but when CC operates (Fig. 5B), on the firing of CCA at the end of the reception on the storage tubes, X, Y and Z series, mechanical relay CCC (Fig. 4A) now operates from earth via *st5* up, *ic5* up, *cc3* up, CCC relay and resistance, to battery. CCC at *ccc1* and 2 reverses the winding of relay TRA so that it responds to marks as spaces and vice versa. TRB is unchanged in its response as it must still respond to the unchanged space characterizing the start element.

Thus TRA now converts the intelligence elements of the code from their binary complement back to their original state and impresses these signals upon the pattern just previously established on the storage tubes. The check is made exactly as for the WRU? reply. If the check is faulty, WC operates and connects "WC" to the RC lead to return the signal to the calling party. If the check is correct CC will release at the end of the receipt of the binary complement, by the change-over of gas tube CCA to CCZ and will thus allow CCB to operate by removal of the short circuit at *cc3*. A circuit is thus completed for RD (Fig. 4A) relay from earth via *st3* up, *esa1* normal, *cc1* normal, *ccb3* up, *ic3* up, RD relay to battery. RD operates, followed by RDR, operated via intacts *rd1* to ground, and these relays switch the gas tube circuits for the reading function in the manner fully described above, and subsequent operation is as described in (*a*) above.

It will thus be seen that a satisfactory checking system for the transmission and reception of a subscriber's identity signal may be achieved by transmitting in the binary system of coding the signal and its binary complement.

However, it will be readily appreciated that a similar result may be achieved by other "mutilations" of the signal, an important one of which is that of sending the signal in reverse, e. g., the signal having the intelligence elements SMMSM would be transmitted the second time as MSMMS, the "start" and "stop" elements being unchanged.

For this purpose, it would be necessary to reverse the units distributor (UDA to UDG) in the reading process, so that reading would commence with the "E" tubes in the X, Y and Z series of tubes; methods for reversing a counting chain or for providing a 2-way chain have been already described in the copending application of D. S. Ridler bearing Serial No. 100,462, filed on June 10, 1949. (The consequential reversal of the "start" and "stop" elements would be corrected before transmission.)

While the principles of the invention have been described above in connection with specific embodiments, and particular modifications thereof, it is to be clearly understood that this description is made only by way of example and not as a limitation on the scope of the invention.

What is claimed is:

1. A telecommunication exchange system comprising means for initially transmitting a station identity signal in a first signal form, means for repeating said station identity signal in a different signal form bearing a predetermined relation to said first signal form, means for receiving said station identification signals and for recording said signals in a signal form which is the same for both said signals, comparison equipment operative to compare said recorded signals and control means responsive to said comparison equipment for controlling predetermined operations in accordance with the result of said comparison.

2. A telecommunication exchange system comprising means for initially transmitting a station identity signal coded in a constant total binary system of coding comprising positive and negative elements, means for repeating said station identity signal in its binary complement form, means for receiving said station identity signals and for recording said signals in the initially transmitted signal form, comparison equipment operative to compare said recorded signals and control means responsive to said comparison equipment for controlling predetermined operations in accordance with the result of said comparison.

3. A telecommunication exchange system comprising means for initially transmitting a station identity signal coded in a constant total binary system of coding comprising positive and negative elements, means for repeating said station identity signal in its binary form, means for receiving and comparing said station identity signals comprising a plurality of trigger-controlled gas discharge tubes, means for altering the condition of said tubes by said first mentioned signal, means for converting said repeated signal to the form of said first mentioned signal and means for connecting said converting means to said tubes for operation thereof by said converted signal, and control means responsive to the operation of said tubes for controlling predetermined operations in accordance with the result of said comparison.

4. A telecommunication exchange system comprising means for initially transmitting a station identity signal in a first signal form, means for repeating said station identity signal in a different signal form bearing a predetermined relation to said first signal form, means for receiving and comparing said station identity signals comprising a plurality of trigger-controlled gas discharge tubes, means for altering the condition of said tubes by said initially transmitted identity signal, means for converting said repeated identity signal to the form of said initially transmitted signal and means for connecting said converting means to said tubes subsequent to operation thereof by said initially transmitted identity signal, at least one of said tubes changing its condition when said converted repeated signal differs from said initially transmitted signal, and means responsive to said change of condition of said tube for controlling predetermined operations in response to said change.

5. A telecommunication exchange system comprising means for initially transmitting a station identity signal in a first form comprising positive and negative elements, means for repeating said station identity signal in a different signal form comprising a plurality of positive and negative elements and bearing a predetermined relation to said first signal form, and means for receiving and comparing said signals comprising a register having a plurality of trigger-controlled gas discharge tubes arranged in pairs, in rows, the tubes in each pair being responsive, one to a positive element and the other to a negative element of a received identity signal, a further series of gas discharge tubes adapted to distribute received elements of one identity signal among the said rows and to repeat the distribution for each received identity signal, a further gas discharge tube responsive to an impulse generated by said first mentioned discharge tubes when the received elements of one identity signal do not correspond element for element with a succeeding identity signal and a relay responsive to said further gas discharge tube.

6. A telecommunication exchange system comprising means for transmitting a station identity signal in a first signal form, means for receiving and storing said identity signal and for generating said identity signal in said first signal form, means for comparing said stored signal with said generated signal and control means responsive to said comparing means for controlling predetermined operations in accordance with the result of said comparison.

7. A telecommunication exchange system comprising means for transmitting a station identity signal in a first signal form, means for receiving and storing said identity signal in a predetermined form and for generating said identity signal in said predetermined form, means for comparing said stored signal with said generated signal and control means responsive to said comparing means for controlling predetermined operations in accordance with the result of said comparison.

8. A telecommunication exchange system comprising means for transmitting a station identity signal in a first signal form including a plurality of elements, means for receiving and storing said elements of said identity signal in a predetermined form and for generating said elements in said predetermined form, means for comparing said stored elements with said generated elements and control means responsive to said comparing means for controlling predetermined operations dependent upon the result of said comparison.

9. A telecommunication exchange system comprising means for transmitting a station identity signal in a first signal form, means for receiving and storing said signal comprising a storage circuit having a predetermined response to said signal, means for generating a second signal identical with said identity signal, means for connecting said generating means to said storage circuit, for comparing said stored signal with said generated signal and means connected to said storage circuit for indicating a change in said predetermined response resulting from said comparison.

10. A telecommunication exchange system comprising a calling station including means for transmitting a station identity signal having a first form, means for receiving said signal including a register, said register comprising means for storing said signal in a predetermined form, means controlled by said storing means for transmitting a station identity signal having a predetermined form and for transmitting a station identity signal having a different form related to said last-mentioned predetermined form, means for receiving and comparing said signals transmitted by said register and control means responsive to said receiving and comparing means for controlling predetermined operations in accordance with the result of said comparison.

11. A telecommunication exchange system comprising a calling station including means for transmitting a station identity signal having a first form, means for receiving said signal including a register, said register comprising means for storing said signal in a predetermined form and means controlled by said storing means for transmitting a station identity signal having a predetermined form and for transmitting a station identity signal having a different form related to said last-mentioned predetermined form, means for receiving and storing said identity signal having a predetermined form transmitted by said register and for receiving said identity signal having a related form and comparing said last-mentioned signal with said last-mentioned identity signal having a predetermined form, and control means responsive to said receiving and comparing means for controlling predetermined operations in accordance with the result of said comparison.

12. A telecommunication exchange system comprising a calling station including means for transmitting a called station identity signal, register means for receiving and storing said signal, switching means controlled by said register means for establishing circuit connections between said register means and a called station, and means at said called station for generating said signal and for transmitting said signal to said register means, said register means further comprising means for comparing said stored signal with the signal received from said called station and means under control of said comparing means for establishing a communication circuit between said calling and called stations and alternatively for transmitting a predetermined signal to said calling station in accordance with the results of said comparison.

13. A telecommunication exchange system comprising a calling station including means for transmitting a called station identity signal, first register means for receiving and storing said signal, second register means, switching means controllable by said first register means for establishing circuit connections between said first register means and said second register means, means in said first register for transmitting to said second register a called station identity signal having a predetermined form and for transmitting a called station identity signal having a different form related to said last-mentioned predetermined form, means in said second register for receiving and comparing said signals transmitted by said first register and for storing said identity signal having said predetermined form, a called station including means for transmitting said first-mentioned called station identity signal, switching means controllable by said second register for establishing circuit connections between said second register and said called station, control means under control of said receiving and comparing means in said second register for operating said last-mentioned switching means and establishing a circuit between said second register and said called station and alternatively for transmitting a predetermined signal to said calling station in accordance with the results of said comparison, means in said second register for receiving said station identity signal transmitted by said called station and for comparing said last-mentioned identity signal with the identity signal having said predetermined form stored by said second register, and further control means under control of said last-mentioned receiving and comparing means for establishing a communication circuit between said calling and called stations and alternatively for transmitting a predetermined signal to said calling station in accordance with the results of said last-mentioned comparison.

GEORGE CLIFFORD HARTLEY.
DONALD ADAMS WEIR.

References Cited in the file of this patent

UNITED STATES PATENTS

| Number | Name | Date |
|---|---|---|
| 1,790,189 | White | Jan. 27, 1931 |
| 2,095,144 | Masson | Oct. 5, 1937 |
| 2,261,543 | Doty | Nov. 4, 1941 |
| 2,344,231 | Burns | Mar. 14, 1944 |